(12) United States Patent
Zhang

(10) Patent No.: US 9,936,109 B2
(45) Date of Patent: Apr. 3, 2018

(54) METHOD AND SYSTEM FOR FUSING IMAGES

(75) Inventor: Yun Zhang, Federicton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 17 days.

(21) Appl. No.: 13/880,703

(22) PCT Filed: Oct. 24, 2011

(86) PCT No.: PCT/CA2011/050666
§ 371 (c)(1),
(2), (4) Date: Aug. 16, 2013

(87) PCT Pub. No.: WO2012/051720
PCT Pub. Date: Apr. 26, 2012

(65) Prior Publication Data
US 2013/0335599 A1    Dec. 19, 2013

Related U.S. Application Data

(60) Provisional application No. 61/405,941, filed on Oct. 22, 2010.

(51) Int. Cl.
*H04N 13/02*    (2006.01)
*H04N 5/225*    (2006.01)
*H04N 5/228*    (2006.01)
*H04N 5/247*    (2006.01)

(52) U.S. Cl.
CPC ........... *H04N 5/225* (2013.01); *H04N 13/025* (2013.01); *H04N 5/247* (2013.01)

(58) Field of Classification Search
CPC ............. H04N 5/2258; H04N 5/23232; H04N 5/2355; H04N 5/2356; H04N 13/025; H04N 3/1593; G06T 5/007; G06T 5/50
See application file for complete search history.

(56) References Cited

U.S. PATENT DOCUMENTS

| | | | | |
|---|---|---|---|---|
| 3,785,469 A | * | 1/1974 | Stumpf ................ | B65G 13/10 193/36 |
| 4,101,916 A | | 7/1978 | Gottschalk et al. | |
| 4,652,909 A | * | 3/1987 | Glenn ........................ | 348/262 |
| 5,828,913 A | * | 10/1998 | Zanen ................... | G01C 11/06 348/E13.007 |
| 5,852,502 A | * | 12/1998 | Beckett ................ | G11B 27/031 348/E5.024 |
| 6,785,469 B1 | * | 8/2004 | Ide .......................... | G02B 7/28 250/201.2 |
| 6,788,338 B1 | * | 9/2004 | Dinev ................... | H04N 5/2258 348/222.1 |
| 7,340,099 B2 | | 3/2008 | Zhang | |
| 2002/0110376 A1 | * | 8/2002 | MacLean et al. ............ | 396/429 |

(Continued)

FOREIGN PATENT DOCUMENTS

WO    WO 2012/051720 A2    4/2012

OTHER PUBLICATIONS

PCT International Search Report, dated Dec. 1, 2011.

*Primary Examiner* — Ngoc-Yen Vu
(74) *Attorney, Agent, or Firm* — Eugene F. Derényi; Fogler, Rubinoff LLP

(57) ABSTRACT

A video imaging system including: a low resolution color digital video camera and a high resolution monochromatic digital video camera operably connected to a digital processing system.

30 Claims, 3 Drawing Sheets

(56) References Cited

U.S. PATENT DOCUMENTS

| | | |
|---|---|---|
| 2002/0122113 A1 | 9/2002 | Foote |
| 2006/0119710 A1* | 6/2006 | Ben-Ezra et al. ....... 348/208.99 |
| 2006/0125936 A1 | 6/2006 | Gruhike et al. |
| 2007/0212056 A1* | 9/2007 | Nagata ......................... 396/354 |
| 2007/0279494 A1* | 12/2007 | Aman .................. G01S 3/7864 348/169 |
| 2008/0024390 A1* | 1/2008 | Baker .................. G06T 3/4053 345/1.3 |
| 2009/0231447 A1* | 9/2009 | Paik ..................... G01S 3/7864 348/208.4 |
| 2009/0309987 A1* | 12/2009 | Kimura ................ G06T 3/4038 348/218.1 |
| 2010/0149338 A1* | 6/2010 | Aggarwal ............ H04N 5/2258 348/159 |
| 2010/0177162 A1* | 7/2010 | Macfarlane ........ H04N 13/0059 348/43 |

* cited by examiner

METHOD AND SYSTEM FOR FUSING IMAGES

CROSS REFERENCE TO RELATED APPLICATIONS

This application claims priority from International Patent Application Number PCT/CA2011/050666 filed on 24 Oct. 2011 which claims priority from U.S. Patent Application Ser. No. 61/405,941 filed 22 Oct. 2010.

FIELD OF THE INVENTION

This invention relates to camera imaging.

SUMMARY

According to one or more embodiments of the present invention, a video imaging system comprising a low resolution colour digital video camera and a high resolution monochromatic digital video camera operably connected to a digital processing system. The system can further comprise an object motion module for detecting objects moving within the fields of view of the cameras, and an object position module for determining the position of an object in the overlapping field of view of the cameras.

According to one or more embodiments of the present invention, a method comprising providing an image frame from a low resolution colour digital video camera and a corresponding image frame from high resolution monochromatic digital video camera and fusing the two image frames to obtain a colour image having higher resolution than the image frame from the low resolution colour digital video camera. The method can further comprise providing a three dimensional coordinate system for determining the position of a moving object in the overlapping fields of view of the cameras whereby the two dimensional position of the moving object is determined according its position in the images, whereas the distance from the cameras to the object in the axis perpendicular to the plane of the images is derived from the parallax error between the two image frames to be fused.

According to one or more embodiments of the present invention, a camera imaging system comprising a low resolution colour digital sensor chip, a high resolution monochromatic digital sensor chip, a beam splitter, and a lens, wherein the lens gathers incident light towards the beam splitter, and the beam splitter splits the light towards the two sensor chips. The system further comprises a digital processing system which fuses a low resolution colour image from the colour sensor and a high resolution monochromatic image from monochromatic sensor to produce a high resolution colour image.

DETAILED DESCRIPTION

Figure 1:
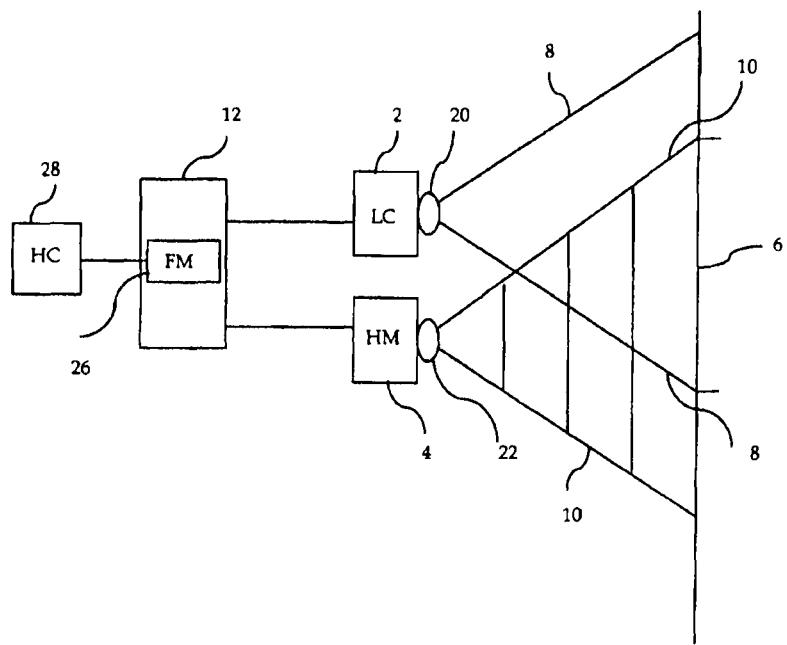
FIG. 1 is a schematic diagram of a dual video image system according to one or more embodiments of the present invention.

Referring to FIG. 1, an overall system configuration for a dual video imaging system according to an embodiment of the present invention comprises a colour digital video camera 2 having lens 20 and a monochromatic digital video camera 4 having lens 22. The cameras 2 and 4 each generate a digital signal of scene 6, which is then transmitted to digital processing system ("DPS") 12.

The cameras 2 and 4 employ charge-coupled device ("CCD") sensors or complementary metal-oxide-semiconductor ("CMOS") sensors. Camera 2 is a low resolution colour ("LC") video camera while camera 4 is a high resolution monochrome ("NM") video camera. Cameras 2 and 4 are capable of providing streaming video signals as part of a security, surveillance or monitoring system. It will be understood, however, that the applications for the cameras 2 and 4 are not limited to such systems.

Camera 2 has a field of view defined by light rays 8 while camera 4 has a field of view defined by light rays 10. Colour camera 2 and monochrome camera 4 produce separate streaming video signals which are then supplied to the DPS 12. The cameras 2 and 4 are adjacent and can be housed together in a single camera housing (not shown).

The low resolution colour streaming video signals from camera 2 are fused by image fusing module ("FM") 26 in processor 12 with corresponding high resolution monochrome streaming video signals from camera 4 to produce a fused high resolution colour streaming video signal ("HC") 28. Fusing the colour and monochrome video signals provides the dual camera system with improved sensitivity capable of acquiring high resolution colour video signals under poor lighting conditions due to the inclusion of the high resolution signal from the monochrome camera and the colour signal from the colour camera.

The colour and monochrome video signals are comprised of individual image frames. Corresponding pairs of video image frames from cameras 2 and 4 are isolated and then fused. Various methods for fusing the frame pairs can be used. For example, image fusion methods for fusing a low resolution multispectral satellite images with high resolution panchromatic satellite images are known in the field of remote sensing and can be adapted to fuse video image frames from cameras 2 and 4. One such fusion method is disclosed in U.S. Pat. No. 7,340,099 (Zhang) which is incorporated herein by reference in its entirety. Other image fusion methods used for satellite imagery include arithmetic based, statistics based, ratio based and wavelet based methods. By substituting colour and monochrome video image frame pairs according to the present invention for multispectral and panchromatic images respectively, prior art image fusing methods can be adapted to fuse video image frames acquired by camera 2 with video image frames acquired by camera 4.

Figure 2:
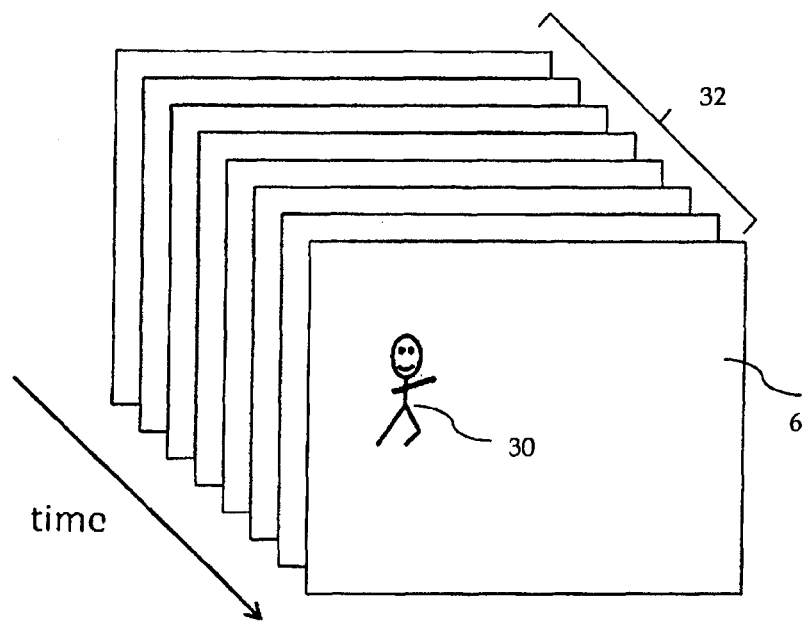
FIG. 2 is a schematic diagram of consecutive image frames according to one or more embodiments of the present invention.

In a further aspect, referring to FIG. 2, a moving object 30 in the scene 6 can be detected by both video cameras 2 and 4 based on finding changes in the consecutive image frames 32 of each video camera. If there is no moving object in the scene 6, the images in the consecutive frames will be the same. If there is a moving object 30 in scene 6, the images in the consecutive frames will not be the same. The changed area between two adjacent frames is the location of the moving object on the image. The changed areas can be found by comparing images in adjacent frames. Suitable conventional methods, techniques and algorithms for comparing consecutive image frames and finding changes in such image frames can be adopted for this system to find moving objects in consecutive images frames from each of the two cameras 2 and 4.

Figure 3:
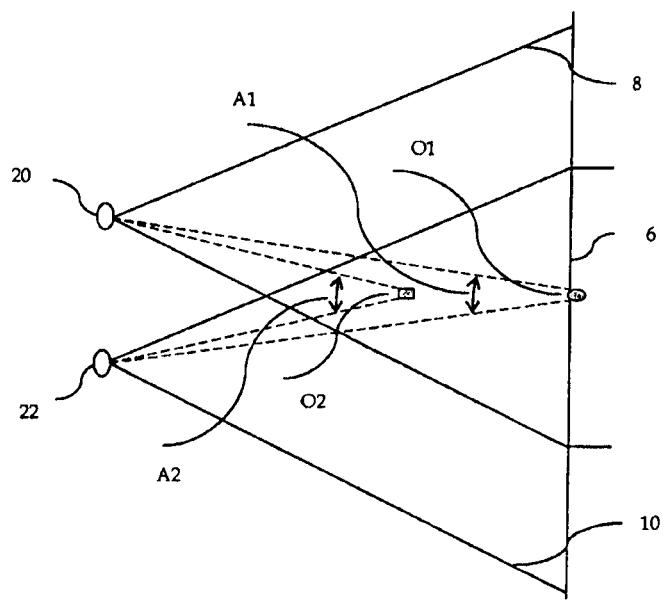
FIG. 3 is a schematic diagram of a two camera system according to one or more embodiments of the present invention.

In a still further aspect, referring to FIG. 3, the position of objects 01 and 02 in the scene 6 is provided in a three dimensional coordinate system. Since cameras 2 and 4 are adjacent, not overlaid with each other, the light rays from lens 20 and lens 22 to any object in the scene 6 are not parallel. The closer the object to the two lenses, the larger the angle between the two light rays from the two lenses to the object. For example, the object 02 is closer to the two lenses 20 and 22 than is object 01. The angle A2 is therefore larger than angle A1. The distance from lenses 20 and 22 to any object in the scene 6 can be calculated according to the base line distance between lenses 20 and 22 and the viewing angle between the two light rays. This distance gives the coordinate along the Z-axis of the three-dimensional coordinate system. Using the base line distance between the two lenses and the viewing angle between the two light rays to determine the distance from an airborne sensor to a ground object is well known in the fields of photogrammetry and computer vision. Such methods can be adapted to determine the distance to objects in the scene 6 because cameras 2 and 4 view essentially the same scene, but there is a parallax between the field of view 8 of camera 2 and the field of view 10 of camera 4.

The plane of the image frames 32 in FIG. 2 is defined by an X-Y coordinate system which is used to position objects (such as object 30) in two dimensions on the image frames 32. The X-Y axis position of an object plus its Z-axis position provides the object's position in three dimensions relative to cameras 2 and 4. The X-Y-Z positions are provided to a position calculating module in the DPS 12 which calculates the position of objects in the scene 6. The position calculating module is programmed with suitable computer algorithms based on prior art photogrammetric or computer vision methods as described above.

In one or more embodiments, the dual camera system according to the present invention provides colour video with improved sensitivity compared with a conventional video camera, the detection of moving objects, and the three dimensional position of the objects in the common field of view of the cameras 2 and 4.

According to one or more embodiments of the present invention, methods of the present invention can be applied to image frames from two corresponding still cameras.

Figure 4:
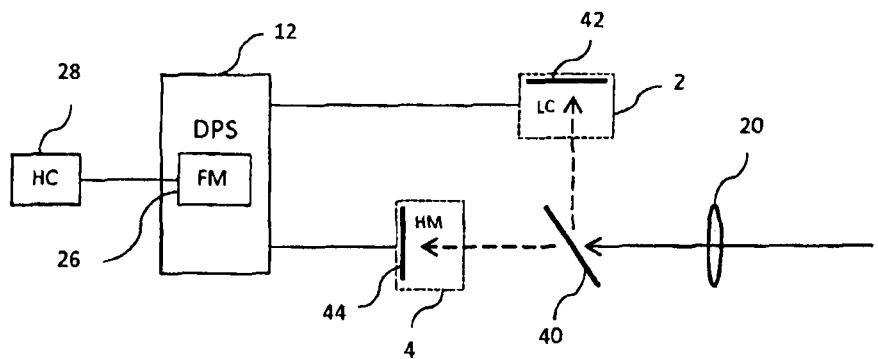
FIG. 4 is a schematic diagram of a two sensor single lens system according to one or more embodiments of the present invention.

In a still further aspect, referring to FIG. 4, the dual imaging system described above with initial reference to FIG. 1 is modified by replacing the dual cameras and dual lenses with a dual sensor single lens camera. Lens 22 is omitted and a light splitter 40 is added. The light beam splitter 40 splits the incoming light into two directions. Camera 2 is re-configured with its low resolution digital colour sensor 42 towards one of the split light beams and camera 4 is re-configured with its high resolution monochrome digital sensor 44 towards the other split beam.

Cameras 2 and 4 are positioned such that when the light splitter 40 splits the incoming light into two directions, about half of the incident light is directed towards the colour digital sensor 42 and about the other half of the incident light is directed towards the monochromatic digital sensor 44. In this embodiment, the capacity of detecting distance from the camera to a moving object is reduced.

Separate streaming video signals from sensors 42 and 44 are then supplied to the DPS 12 in a similar manner to the signals from cameras 2 and 4 in the system described with initial reference to FIG. 1.

Low resolution colour streaming video signals from sensor 42 are fused by the FM 26 in processor 12 with corresponding high resolution monochrome streaming video signals from sensor 44 to produce a fused high resolution colour streaming video signal ("HC') 28 using the methods described herein.

Figure 5:
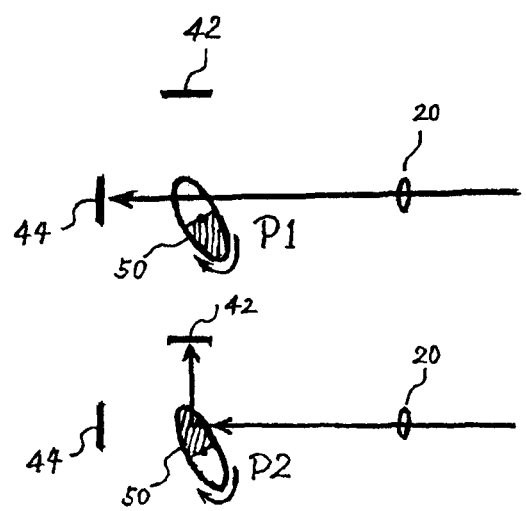
FIG. 5 is a schematic diagram of a rotating half mirror system according to one or more embodiments of the present invention.

In a still further embodiment, referring to FIG. 5, a rotating half mirror 50 or vibrating mirror (not shown) can be used in place of the splitter 40 of FIG. 4. The half mirror 50 rotates between a first position (P1) where incident light from the lens 20 passes through the empty half of the mirror directly reaching the sensor 44 and a second position (P2) where incident light passing through the lens 20 is directed by the half mirror to the sensor 42. The mirror 50 rotates between the first and second positions sufficiently quickly to obtain a suitable image pair of a scene.

It is understood that other devices can be used in place of splitter 40 or a mirror 50, as long as they can direct incident light from lens 20 towards both sensor 42 and sensor 44 simultaneously.

I claim:

1. A video imaging system comprising:
   a low resolution colour digital video camera for providing a stream of low resolution multi-spectral video image frames comprising at least three spectral bands;
   a high resolution monochromatic digital video camera for providing a stream of high resolution monochromatic video image frames; and,
   a digital processing system comprising an image fusing module for isolating corresponding pairs of video image frames from the two streams of video image frames where the video streams use the same frame rate, and fusing the pairs of video image frames to obtain a stream of colour video image frames having a higher resolution than the stream of video image frames from the low resolution colour digital video camera;
   wherein the cameras are operably connected to the digital processing system, and
   wherein the image fusing method used by the image fusing module is selected from the group consisting of an arithmetic based fusion method, a statistics based fusion method, and a ratio based fusion method, and further comprises, for a given pair of the isolated corresponding video image frames, fusing multi-spectral pixels in the multi-spectral video image frame of the given pair with the corresponding monochromatic pixels in the monochromatic video image frame of the given pair, where the fusing is performed in real time without user input or post processing.

2. The video imaging system according to claim 1 further comprising:
   an object motion module for detecting a movement of an object within a field of view of at least one of the cameras, and
   an object position module for determining a position of an object in an overlapping field of view of the cameras.

3. The system according to claim 1 further comprising:
   an object motion module for detecting a movement of an object within a field of view of at least one of the cameras.

4. The system according to claim 1 further comprising:
   an object position module for determining a position of an object in an overlapping field of view of the cameras.

5. The video imaging system according to claim 1 wherein the video cameras are selected from the group consisting of security, surveillance and monitoring video cameras.

6. The video imaging system according to claim 1 further comprising:
provide a three dimensional coordinate system for determining a position of an object in an overlap area of the fields of view of the cameras, by determining two dimensional coordinates of the object from a position of the object on at least one of the two images, and,
determining a distance from the cameras to the object in an axis perpendicular to the plane of the image frames from a parallax between two image frames of the stream of video image frames.

7. The video imaging system of claim 1, wherein the multi-spectral pixels are red, green and blue (RGB) colour pixels or red, green, blue and near infrared colour pixels.

8. A method comprising:
providing a stream of video image frames from a low resolution multi-spectral digital video camera;
providing a corresponding stream of video image frames from a high resolution monochromatic digital video camera where the video streams use the same frame rate;
isolating corresponding pairs of video image frames from the two streams of video image frames;
fusing the pairs of video image frames to obtain a stream of multi-spectral video image frames having a higher resolution than the stream of video image frames from the low resolution multi-spectral digital video camera;
wherein the image fusing method for fusing the two streams of video images is selected from the group consisting of an arithmetic based fusion method, a statistics based fusion method, and a ratio based fusion method, and further comprises, for a given pair of corresponding video image frames, fusing multi-spectral pixels in the multi-spectral video image frame of the given pair with the corresponding monochromatic pixels in the monochromatic video image frame of the given pair, where the fusing is performed in real time without user input or post processing.

9. The method according to claim 8 wherein the video cameras are selected from the group consisting of security, surveillance and monitoring video cameras.

10. The method according to claim 8 further comprising:
isolating two image frames from at least one of the cameras;
comparing the two image frames; and,
identifying at least one difference in the two image frames.

11. The method according to claim 10 further comprising:
relating the at least one difference to motion of an object in the overlap area.

12. The method according to claim 8 further comprising:
providing a three dimensional coordinate system for determining a position of an object in an overlap area of the fields of view of the cameras, by determining two dimensional coordinates of the object from a position of the object on at least one of the two images; and,
determining a distance from the cameras to the object in an axis perpendicular to the plane of the image frames from a parallax between two image frames of the stream of video image frames.

13. The video imaging system of claim 8, wherein the multi-spectral pixels are red, green and blue (RGB) colour pixels or red, green, blue and near infrared colour pixels.

14. An imaging system comprising:
a digital video camera comprising:
a low resolution colour digital sensor;
a high resolution monochromatic digital sensor;
a lens;
a beam splitter for directing incident light passing through the lens to the colour and monochromatic sensors; and,
a digital processing system comprising an image fusing module for fusing a stream of video image frames from the colour digital sensor with a stream of video image frames from the monochromatic digital sensor, where the video streams use the same frame rate, and wherein the sensors are operably connected to the digital processing system; and
wherein the image fusing method used by the image fusing module is selected from the group consisting of an arithmetic based fusion method, a statistics based fusion method, and a ratio based fusion method, and further comprises isolating corresponding pairs of video image frames from the two streams of video image frames and for a given pair of corresponding video image frames, fusing multi-spectral pixels in the colour video image frame of the given pair with the corresponding monochromatic pixels in the monochromatic video image frame of the given pair, where the fusing is performed in real time without user input or post processing.

15. The imaging system according to claim 14 wherein the video camera is selected from the group consisting of security, surveillance and monitoring video camera.

16. A video imaging system comprising:
a colour digital video camera for providing a stream of low resolution multi-spectral video image frames;
a monochromatic digital video camera for providing a stream of high resolution monochromatic video image frames; and,
a digital processing system comprising an image fusing module for isolating corresponding pairs of video image frames from the two streams of video image frames where the video streams use the same frame rate, and fusing the pairs of video image frames to obtain a stream of colour video image frames having a higher resolution than the stream of the low resolution multi-spectral video image frames from the multi-spectral digital video camera;
wherein the cameras are operably connected to the digital processing system, and
wherein the image fusing method used by the image fusing module is selected from the group consisting of an arithmetic based fusion method, a statistics based fusion method, and a ratio based fusion method, and further comprises for a given pair of corresponding video image frames, fusing multi-spectral pixels in the multi-spectral video image frame of the given pair with the corresponding monochromatic pixels in the monochromatic video image frame of the given pair, where the fusing is performed in real time without user input or post processing.

17. The video imaging system according to claim 16 further comprising:
an object motion module for detecting a movement of an object within a fields of view of at least one of the cameras, and
an object position module for determining a position of an object in the an overlapping field of view of the cameras.

18. The system according to claim 16 further comprising: an object motion module for detecting a movement of an object within a field of view of at least one of the cameras.

19. The system according to claim 16 further comprising: an object position module for determining a position of an object in an overlapping field of view of the cameras.

20. The video imaging system according to claim 16 wherein the video cameras are selected from the group consisting of security, surveillance and monitoring video cameras.

21. The video imaging system according to claim 16 further comprising:
providing a three dimensional coordinate system for determining a position of an object in an overlap area of the fields of view of the cameras, by determining two dimensional coordinates of the object from a position of the object on at least one of the two images, and,
determining a distance from the cameras to the object in an axis perpendicular to the plane of the image frames from a parallax between two image frames of the stream of video image frames.

22. The video imaging system of claim 16, wherein the multi-spectral pixels are red, green and blue (RGB) colour pixels or red, green, blue and near infrared colour pixels.

23. A method comprising:
providing a stream of low resolution multi-spectral digital video image frames;
providing a corresponding stream of high resolution monochromatic digital video image frames where the video streams use the same frame rate; and,
isolating corresponding pairs of video image frames from the two streams of video image frames and fusing the two streams of video image frames to obtain a stream of colour video image frames having a higher resolution than the stream of low resolution multi-spectral digital video image frames;
wherein the image fusing method for fusing the two streams of digital video image frames is selected from the group consisting of an arithmetic based fusion method, a statistics based fusion method, and a ratio based fusion method, and further comprises, for a given pair of corresponding video image frames, fusing multi-spectral pixels in the multi-spectral video image frame of the given pair with the corresponding monochromatic pixels in the monochromatic video image frame of the given pair, where the fusing is performed in real time without user input or post processing.

24. The method according to claim 23 wherein the stream of low resolution colour digital video image frames is provided by a digital sensor and the stream of high resolution monochromatic digital video image frames is provided by the digital sensor.

25. The method according to claim 23 wherein the stream of low resolution colour digital video image frames and the stream of high resolution monochromatic digital video image frames are provided by a digital video camera.

26. The method according to claim 25 wherein the camera is selected from the group consisting of a security, surveillance and monitoring video cameras.

27. The method according to claim 23 further comprising:
isolating two image frames from at least one of the streams; comparing the two image frames; and,
identifying at least one difference in the two image frames.

28. The video imaging system of claim 23, wherein the multi-spectral pixels are red, green and blue (RGB) colour pixels or red, green, blue and near infrared colour pixels.

29. An imaging system comprising:
a digital video camera comprising:
a colour digital sensor;
a monochromatic digital sensor;
a lens; and
a beam splitter for directing incident light passing through the lens to the colour and monochromatic sensors; and,
a digital processing system comprising an image fusing module for fusing a stream of low resolution video image frames from the colour digital sensor with a stream of high resolution video image frames from the monochromatic digital sensor, where the video streams use the same frame rate, and wherein the sensors are operably connected to the digital processing system; and
wherein the image fusing method used by the image fusing module is selected from the group consisting of an arithmetic based fusion method, a statistics based fusion method, and a ratio based fusion method, and further comprises isolating corresponding pairs of video image frames from the two streams of video image frames and for a given pair of corresponding video image frames, fusing multi-spectral pixels in the colour video image frame of the given pair with the corresponding monochromatic pixels in the monochromatic video image frame of the given pair, where the fusing is performed in real time without user input or post processing.

30. The imaging system according to claim 29 wherein the video camera is selected from the group consisting of security, surveillance and monitoring video camera.

* * * * *